United States Patent
Grant

(10) Patent No.: US 8,342,995 B2
(45) Date of Patent: Jan. 1, 2013

(54) DRIVE ARRANGEMENT WITH OPEN LOOP HYDRAULIC MECHANISM OPERABLE AS A PUMP OR A MOTOR

(75) Inventor: Norman Grant, Midrand (ZA)

(73) Assignee: Ducere Holdings (PTY) Limited, Midrand (ZA)

( * ) Notice: Subject to any disclaimer, the term of this patent is extended or adjusted under 35 U.S.C. 154(b) by 289 days.

(21) Appl. No.: 12/741,186

(22) PCT Filed: Nov. 3, 2008

(86) PCT No.: PCT/IB2008/054560
§ 371 (c)(1),
(2), (4) Date: Sep. 22, 2010

(87) PCT Pub. No.: WO2009/057082
PCT Pub. Date: May 7, 2009

(65) Prior Publication Data
US 2011/0003660 A1    Jan. 6, 2011

(30) Foreign Application Priority Data
Nov. 1, 2007   (ZA) .................................. 2007/09472

(51) Int. Cl.
*F16H 3/72* (2006.01)
*B60K 25/10* (2006.01)
(52) U.S. Cl. ............................................. 475/1; 180/165
(58) Field of Classification Search ........................ 475/1
See application file for complete search history.

(56) References Cited

U.S. PATENT DOCUMENTS

| | | | |
|---|---|---|---|
| 3,665,788 A | 5/1972 | Nyman | |
| 4,098,144 A * | 7/1978 | Besel et al. | 74/661 |
| 4,382,484 A | 5/1983 | Anderson et al. | |
| 4,815,334 A * | 3/1989 | Lexen | 74/661 |
| 4,986,383 A | 1/1991 | Evans | |
| 5,554,007 A | 9/1996 | Watts | |
| 6,170,587 B1 * | 1/2001 | Bullock | 180/69.6 |
| 6,575,872 B2 * | 6/2003 | Gluck et al. | 477/68 |
| 6,626,785 B2 * | 9/2003 | Pollman | 475/82 |

(Continued)

FOREIGN PATENT DOCUMENTS
WO    WO 03/046380    6/2003
(Continued)

OTHER PUBLICATIONS
International Search Report for PCT/IB/2008/054560 dated Jul. 31, 2009.

*Primary Examiner* — Dirk Wright
(74) *Attorney, Agent, or Firm* — Henry B. Ward, III; Moore & Van Allen PLLC

(57) ABSTRACT

A drive arrangement suitable for driving a final drive comprises a first drive means and a power-splitting gear arrangement. A first hydraulic mechanism is operable either as a pump or a motor. The first hydraulic mechanism is capable of being driven from the first drive means or from the final drive or both concurrently, acting through the gear arrangement. The final drive is drivable through the gear arrangement from the first drive means or the first hydraulic mechanism or both concurrently.

15 Claims, 4 Drawing Sheets

U.S. PATENT DOCUMENTS

| | | |
|---|---|---|
| 6,712,166 B2 | 3/2004 | Rush et al. |
| 6,719,080 B1 * | 4/2004 | Gray, Jr. .................. 180/165 |
| 7,337,869 B2 * | 3/2008 | Gray et al. ................ 180/307 |
| 7,374,005 B2 * | 5/2008 | Gray, Jr. .................. 180/165 |
| 7,597,172 B1 * | 10/2009 | Kovach et al. ............ 180/305 |
| 7,984,783 B2 * | 7/2011 | Gray et al. ................ 180/307 |
| 8,079,437 B2 * | 12/2011 | Rosman .................... 180/165 |
| 8,162,094 B2 * | 4/2012 | Gray et al. ................ 180/305 |
| 2009/0036248 A1 * | 2/2009 | Mueller et al. ............ 475/72 |

FOREIGN PATENT DOCUMENTS

| | | |
|---|---|---|
| WO | WO 03/062602 | 7/2003 |
| WO | WO 2007/104539 | 9/2007 |

\* cited by examiner

DRIVE ARRANGEMENT WITH OPEN LOOP HYDRAULIC MECHANISM OPERABLE AS A PUMP OR A MOTOR

INTRODUCTION AND BACKGROUND

This invention relates to a drive arrangement. More specifically, but not exclusively, this invention relates to a drive arrangement utilizing hybrid power for vehicles and having regenerative braking and engine optimization capabilities.

The reduction of exhaust emissions and the reduction of fuel consumption is becoming a global priority, as carbon based fuel reserves dwindle. Many alternative transmission and drive arrangement concepts have been proposed in furtherance of these objectives.

Some well-known concepts are that of regenerative braking and engine optimization. Vehicles having regenerative braking are equipped with an energy storage device for capturing and storing energy that would normally be released as heat from normal braking and dissipate into the atmosphere. Engine optimization is the concept to use the engine only in certain predetermined modes where the engine operates more efficiently and either to store any excess energy produced by the engine by some means, such as batteries or hydraulic pressure and then to use the stored energy during periods where the engine is not in use. One well-known regenerative braking system is to use an electrical motor generator system to brake a vehicle, either instead of or together with conventional brakes. The generator creates electricity and charges up a battery while it is used to slow the vehicle down. The charged battery is then used to drive electric motor(s) to power the drive train of the vehicle again. The same concept can be used for engine optimization where the electric generator is used to store engine energy and then this energy is used during periods when the engine is not used.

OBJECT OF THE INVENTION

It is an object of this invention to provide a drive arrangement that at least partially alleviates disadvantages of prior art arrangements, or offers an alternative to the prior art arrangements.

SUMMARY OF THE INVENTION

According to the invention a drive arrangement suitable for use in driving a final drive, comprises
 a first drive means;
 a power-splitting gear arrangement;
 a first hydraulic mechanism operable as either a pump or a motor;
 the first hydraulic mechanism being capable of being driven from the first drive means or from the final drive or both concurrently, acting through the gear arrangement; and
 the final drive being drivable through the gear arrangement from the first drive means or the first hydraulic mechanism or both concurrently.

The hydraulic mechanism may have a hydraulic energy storage means associated with it, such as art accumulator tank.

The hydraulic mechanism may comprise an open loop over-centre variable displacement hydraulic device that can be operated as a pump or as a motor. A hydraulic device that is operable as a pump or a motor, is sometimes hereinafter referred to as a pump/motor device.

The hydraulic device may be an open loop over-centre variable displacement axial piston hydraulic device that can be operated as a pump or as a motor.

The hydraulic device may be an open loop axial piston hydraulic device having a manipulatable swash-plate that may be controlled to move over-centre to allow the hydraulic device to operate as a pump or as a motor.

In some embodiments, the hydraulic device may be a gear pump/motor device.

The hydraulic mechanism may comprise at least first and second devices, each selectively operable as a pump or a motor. The at least first and second pump/motor devices may be connected in series and configured to operate independently of each other.

The pump/motor devices may be operable independently of each other, so that at least one of the pump/motor devices may operate as a pump, while at least one other pump/motor device operates as a motor.

The power ratio of the two pump/motor devices may be in the order of 1:3.

At least one of the pump/motor devices may be a gear pump/motor device and another a variable displacement device.

In this embodiment, the power ratio of the two pump/motor devices may be in the order of 2:2.

The power-splitting gear arrangement may be mechanical.

The power-splitting gear arrangement may comprise a planetary gear or any differential-type mechanical connection that allows a split in the amount and direction of power transmitted through it.

The power splitting gear arrangement may be connected to any of the first drive means, the first hydraulic device, and the final drive by a respective shaft.

The power splitting gear arrangement may be connected to any of the first drive means, the hydraulic device, and the final drive by a drive belt.

The power-splitting gear arrangement may include a clutch and brake arrangement whereby the gear ratios between the first drive means, the first hydraulic device, and the final drive may be varied by coupling and/or engaging the clutch or brake or both.

The clutch and brake arrangement may serve to disconnect any of the first drive means, the first hydraulic device, and the final drive from the gear arrangement, while locking any of the gears in a stationary position.

The gears may be locked by locking the shafts that they are attached to.

The first drive means may be an internal combustion engine, such as a diesel or petrol engine.

The first drive means may be an external combustion engine, such as a Stirling engine.

The first drive means may be an electrical motor, and may be accompanied by an electrical storage means such as electrical batteries.

The arrangement may further include a control system for controlling the relative outputs and inputs of any combination of the hydraulic device, first drive means, or gear arrangement and the various clutches and brakes in the system.

The control system may further control operation of the clutch and brake arrangement.

The control system may operate according to a control algorithm.

The drive arrangement may be used in a vehicle.

The control system may control the relative outputs and inputs of any combination of the first hydraulic device, first drive means, clutch and brake arrangement or gearbox according to a terrain logging and prediction facility.

The terrain logging and prediction facility may be incorporated in the control algorithm.

The terrain logging and prediction facility may operate by means of a Global Positioning System (GPS) or an electronic mapping system.

The arrangement may include a second hydraulic mechanism configured to allow the first drive arrangement to store energy in the hydraulic energy storage means while the energy is being utilised by the first hydraulic mechanism to drive the final drive.

The second hydraulic mechanism may be similar to the first hydraulic mechanism.

The second hydraulic mechanism may also be configured to drive the final drive.

Further according to the invention there is provided a variable displacement axial piston hydraulic device comprising:
a cylinder barrel having a main axis and defining a plurality of cylinders to extend parallel to the main axis;
a porting member mounted at one end of the cylinder;
the porting member defining a first chamber and a second chamber therein;
the barrel being rotatable relative to the porting member to bring the cylinders into alternate communication with the first and second chambers;
a respective piston mounted for reciprocating motion in each of the cylinders;
parts of the pistons extending beyond the other end of the barrel;
a awash-plate located adjacent the other end of the barrel and having a face facing the barrel, so that the parts of the pistons abut against the face;
the swash-plate being pivotable, so that the face may be manipulated between a centre position wherein the face is perpendicular to the main axis of the barrel, positions wherein the face forms a positive angle with the center position and positions wherein the face forms a negative angle with the center position.

These and other features of the invention are described in more detail below.

BRIEF DESCRIPTION OF THE DRAWINGS

An embodiment of the invention is described below purely as an example thereof and without limiting the scope of the invention with reference to the accompanying drawings, wherein.

DETAILED DESCRIPTION OF THE DRAWINGS

Figure 1:
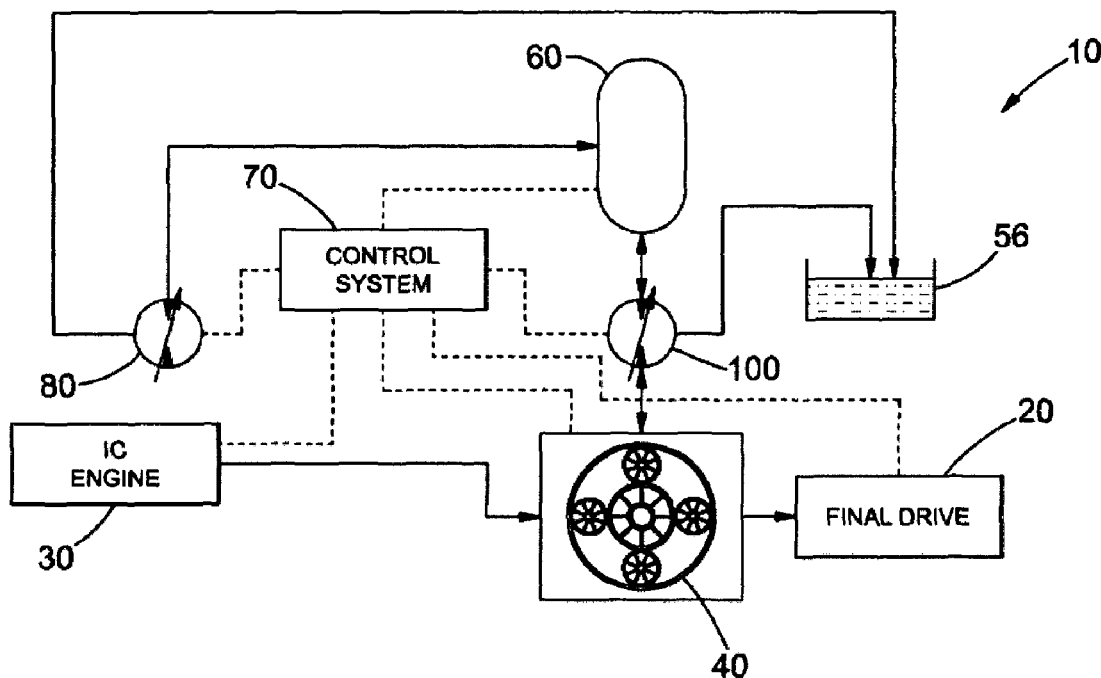
FIG. 1 is a schematic view of a drive arrangement according to the invention.

With reference to the drawings, an embodiment of a drive arrangement according to the invention is generally indicated by reference numeral 10.

According to the invention a drive arrangement 10 for driving a final drive 20 comprises a first drive means such as an internal combustion (IC) engine 30; and a power-splitting gear arrangement, such as a planetary gearbox 40 utilizing known technology. The drive arrangement 10 further comprises a hydraulic mechanism 100 operable as either a pump or a motor. Further, the hydraulic mechanism 100 is capable of being driven from the IC engine 30 or from the final drive 20 or both concurrently, acting through the gearbox 40; and the final drive 20 is capable of being driven through the gearbox 40 by the IC engine 30 or the hydraulic mechanism 100 or both concurrently.

The hydraulic mechanism 100 has a hydraulic energy storage means, such as an accumulator tank 60, associated with it, as well as a reservoir tank 56.

Figure 3:
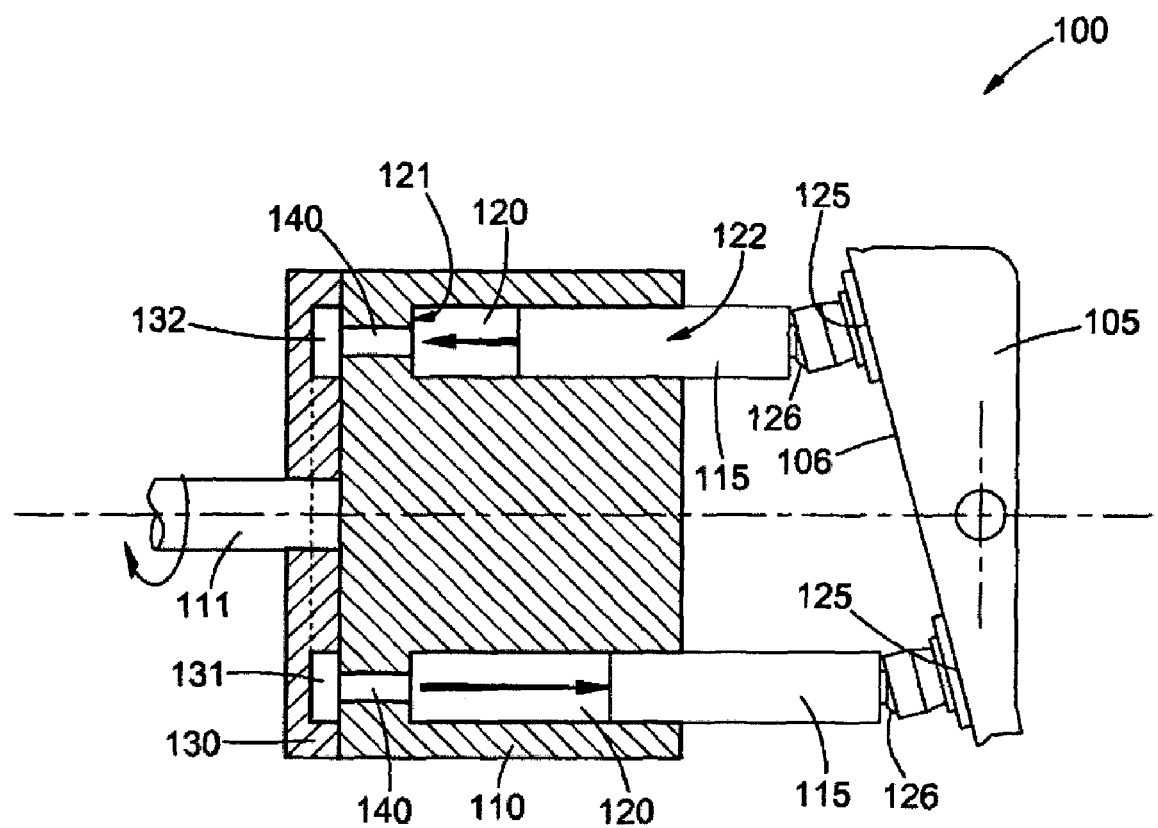
FIG. 3 is a cutaway schematic view of a the variable swath-plate over-center hydraulic device, illustrating the operation of the hydraulic device.
Figure 4:
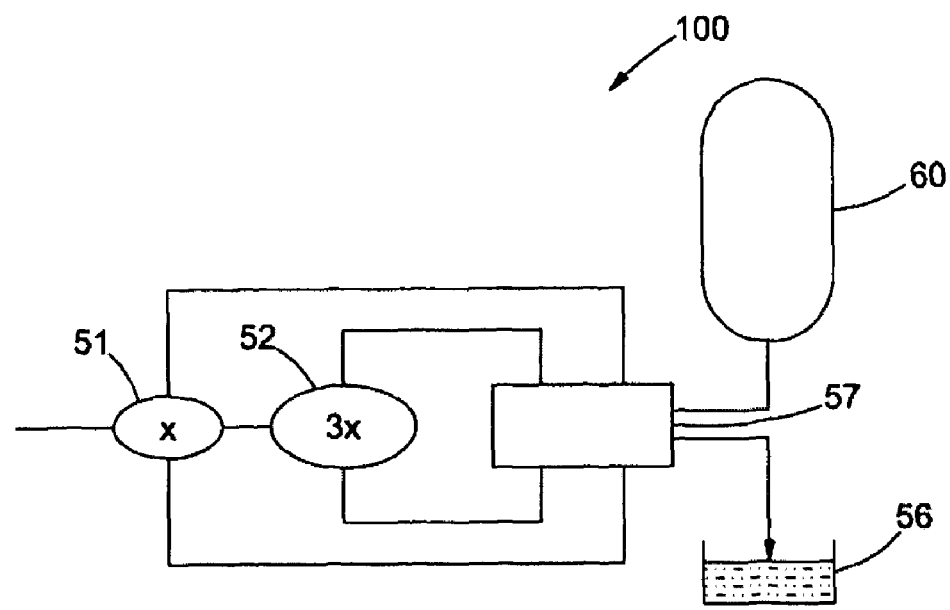
FIG. 4 is a schematic layout of another embodiment of the hydraulic mechanism according to the invention embodied as a pair of constant speed gear pump/motor devices, each set up to operate as both a pump or motor.

In one embodiment, the hydraulic mechanism 100 comprises an open loop over-centre variable displacement hydraulic device that can be operated as a pump or as a motor, such as an axial piston-type hydraulic device (as shown in FIGS. 3 and 4) utilizing a variable swash-plate 105, or a bent-axis type axial piston pump (not shown) wherein the angle of the swash-plate 105 or equivalent may be varied to move over-centre.

The hydraulic device 100 shown in FIGS. 3 and 4 comprises a rotating cylinder barrel 110, which is fixed to a shaft 111 so that it is able to be rotated by the shaft 111, or to rotate the shaft 111, the cylinder barrel 110 further having a plurality of pistons 115 which are able to reciprocate within cylinder bores 120 (as shown in FIG. 4) within the cylinder barrel 110. The cylinder bores have a terminal end 121 within the cylinder barrel 110, and an open end 122 at the swash-plate 105 side of the cylinder barrel 110. The hydraulic device 100 further comprises a swash-plate 105, movable through a range of angles relative to the cylinder barrel 110. The angle at which the facing side 106 of the swash-plate 105 is exactly perpendicular to the axis of the cylinder barrel 110 is regarded as the zero angle.

The swash-plate 105 is able to move through a range of both positive and negative angles. The hydraulic device 100 further comprises a porting plate 130 which is stationary and which sealingly abuts against the cylinder barrel 110 as the cylinder barrel 110 rotates. The porting plate 130 has a high pressure channel 131 and a low pressure channel 132 in it, which are in fluid communication with the cylinder bores 120 in the cylinder barrel 110 through porting passages 140 leading from the terminal end of the cylinder bores 120 in the terminal end 121 of the cylinder bores 120. As the cylinder barrel 110 rotates, the cylinder bores 120 will be in alternating fluid communication with the high pressure channel 131 and the low pressure channel 132.

When the hydraulic device 100 is used as a motor, a high pressure fluid is supplied to the porting plate 130 at the high pressure channel 131, while the low pressure channel 132 is left at a relatively low pressure (such as ambient pressure or slightly higher than this).

The pistons 115 are held against the swash-plate 105 by the pressure within the cylinder bores 120 or by biasing means (not shown). Lubricated slippers 125 are mounted onto the ends of the pistons 115 closest to the swash-plate 105 by means of a ball coupling 126. The cylinder bore 120 of a piston 115 will come into fluid communication with the high pressure port 131 of the porting plate 130 at a point where the swash-plate 105 has pushed the piston 115 into the cylinder bore 120 to its most retracted extent.

Figure 2:
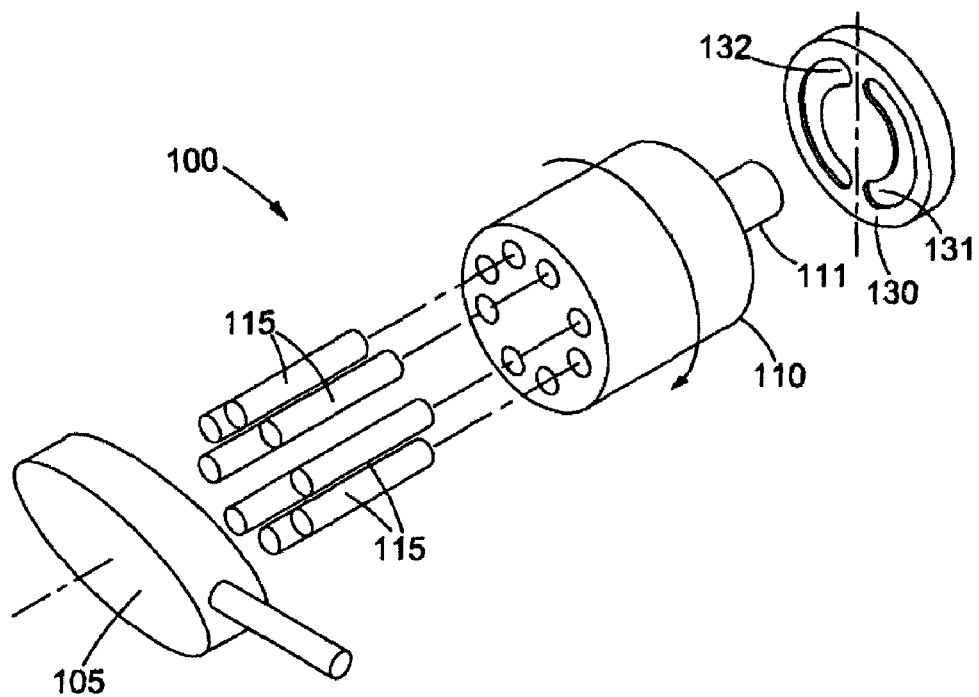
FIG. 2 is an assembly view schematic of one embodiment of a hydraulic mechanism of the arrangement comprising a variable swash-plate aver-center hydraulic mechanism according to the invention.

High pressure, from the high-pressure channel 131, acting on a piston is transferred as a force to the swash-plate 105 through the slipper 125, which also transmits the reactive force of the swash-plate 105 on the slipper 125 back to the piston 115. When the swash-plate 105 is angled relative to a plane transverse to the cylinder barrel 110, then the reactive force of the swash-plate 105 on the slippers 125 has a transverse component, which is also transferred to the piston 115, which causes the cylinder barrel 110 and hence the shaft 111 to move. As the cylinder barrel 110 rotates the piston 115 will reach its most extended point, at which time the cylinder bore 120 of the piston 115 will change to being in fluid communication with the low pressure channel 132 of the porting plate 130. As the cylinder barrel 110 rotates further, the force of the swash-plate 105 against the piston 115 will push the piston 115 into the cylinder bore 120 with little resistance, as there will be little or no pressure in the cylinder bore acting against the piston 115. During the retraction of the piston 115, the low-pressure fluid will be expelled from the cylinder bore 120 to a fluid reservoir 56 (shown in FIG. 2).

When the hydraulic device 100 is used as a pump, a torque is applied to the shaft 111, causing the cylinder barrel 110 to rotate about its axis. The hydraulic device 100 remains the same, except that the swash-plate 105 is moved to an over centre position (i.e. past the zero angle) from the position it was in when the device 100 was used as a motor. Now, the pistons 115 will be pushed to a retracted position against the fluid pressure in the high-pressure channel 131, thereby increasing the pressure in the high-pressure channel 131. This pressure is dispersed to an accumulator tank 60. When the cylinder bore 120 is in fluid communication with the low pressure channel 132, the piston is moved into an extended position by a slight pressure in the cylinder bore 120, or by a biasing means (not shown).

By having a variable swash-plate arrangement, the load created by the hydraulic pump/motor device when used as a pump may be finely controlled from zero load (when the facing side 106 of the swash-plate 105 is disposed perpendicularly to the axis of rotation of the cylinder barrel 110) to maximum load through an infinite number of steps. Similarly, the amount of power delivered by the hydraulic pump/motor device when used as a motor may be increased from zero power to maximum available power through an infinite number of steps.

Figure 5:
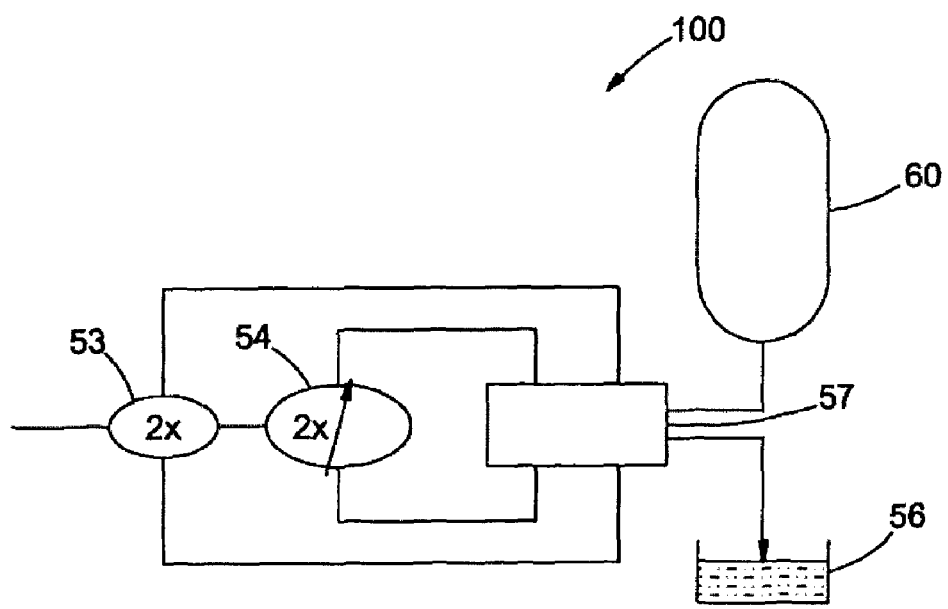
FIG. 5 is a schematic layout of yet another embodiment of the hydraulic mechanism according to the invention comprising a pair of pump/motor, one of which is a variable pump/motor device, and which can operate as a variable pump or motor by controlling the speed and or direction of both.

In another embodiment, it is envisaged that the hydraulic mechanism 100 may comprise a pair of pump/motor devices. The pump/motor devices may be gear pump/motor arrangements 51 and 52 (as shown in FIG. 5) connected in series, the pump/motor devices 51 and 52 being associated with a reservoir tank 56 and an accumulator tank 60. In these embodiments, the pair of gear pump/motor devices 51 and 52 are connected in series, and each can be operated independently of each other through a valve control manifold 57 to act as either a pump or motor.

In this embodiment, it is envisaged that a preferable power ratio between the two gear pump/motor devices 51 and 52 will be in the order of 1:3. By using the summation and/or differential of these two gear pump/motor devices 51 and 52, the hydraulic mechanism 100 can provide stepped increments in relative power as both a motor and as a pump from −4 (1−3), −3 (0−3), −2 (+1−3), −1 (−1−0), 0, 1(+1−0), 2(−1+3), 3(0+3), and 4 (+1+3). The independent control of the gear pump/motor devices 51 and 52 will be through a valve It is envisaged that utilizing this embodiment of the hydraulic device will allow for a reasonable amount of incremental control of the drive arrangement 10, while having good cost benefits, as gear pump/motor arrangements are generally cheaper than piston pumps.

Figure 6:
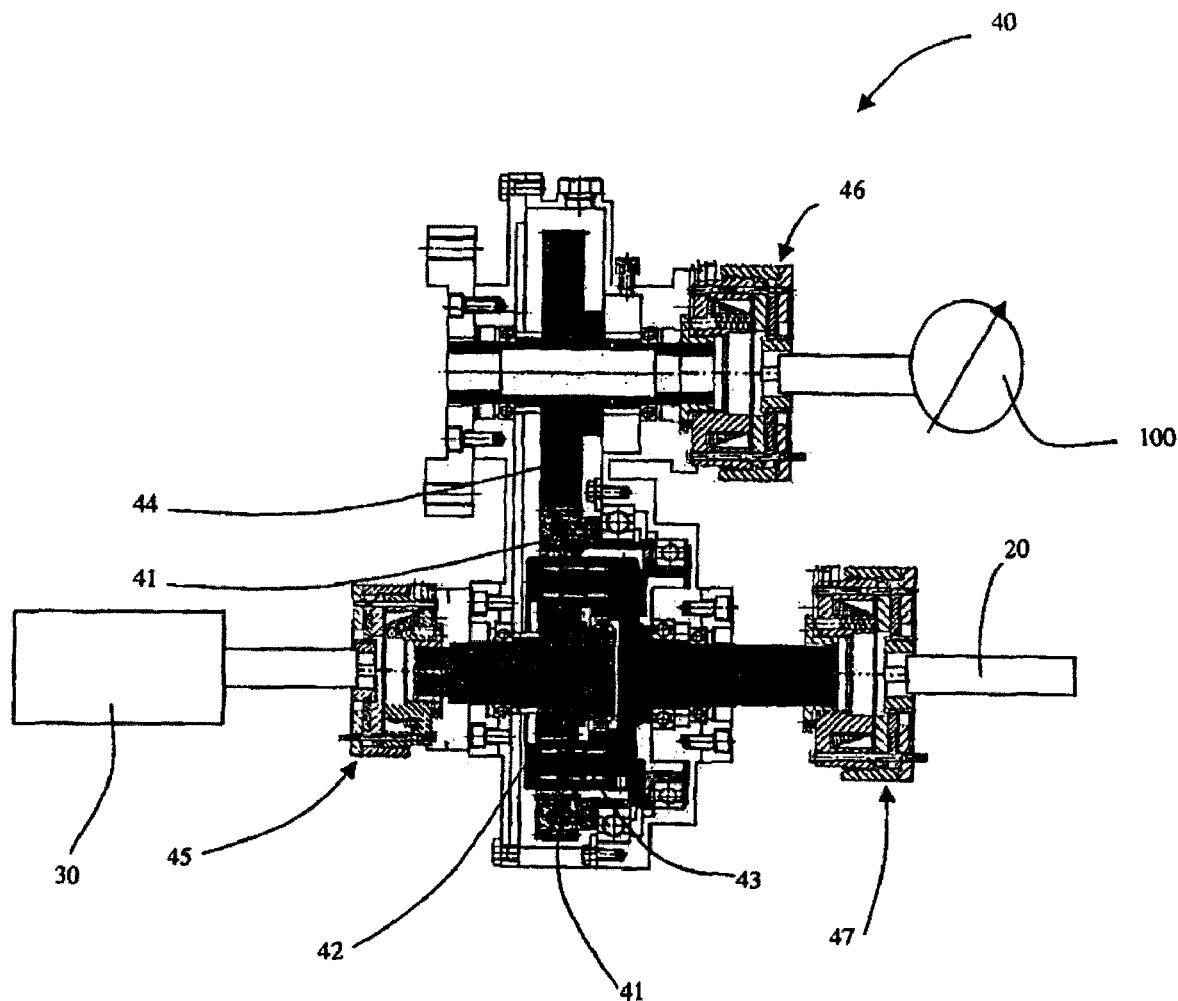
FIG. 6 is a schematic layout of the drive arrangement also illustrating a power splitting gear arrangement and its associated sets of clutches and brakes.

As shown in FIG. 6 it is envisaged that at least one of the pump/motor devices 53 and 54 may be a variable displacement pump/motor device 54. These pump/motor devices 53 & 54 are also associated with a reservoir tank 56 and an accumulator tank 60, and controlled through a valve control manifold 57.

In this embodiment, it is envisaged that the preferred ratio between the pair of pump/motor devices 53 and 54 will be approximately 2:2.

Similarly, by using the summation and/or differential of these two pump/motor arrangements 53 and 54, the hydraulic mechanism 100 can provide an infinitely variable control of the relative power provided by the hydraulic mechanism when used as motor, as well as an infinitely variable control of the relative load created by the hydraulic mechanism when used as a pump, ranging from −4 to +4. The variable displacement pump/motor device 54 may have a slightly increased size, to accommodate leakage losses.

It is envisaged that utilizing this embodiment of the hydraulic mechanism will allow for a reasonable amount of variable control of the drive arrangement 10, while also have good cost benefits for increased control.

In one preferred embodiment, the power splitting gear arrangement is a planetary gearbox 40, although it can also be any differential-type mechanical connection that allows a split in the amount and direction of power transmitted through it.

A power splitting planetary gearbox 40 according to the invention is shown in FIG. 7. Any of either of the IC engine 30, the hydraulic device 100, or the final drive 20 can be connected to any of a ring gear 41, sun gear 42 or a planet carrier gear 43 by a series of clutches (not shown) by known means found on automatic gearboxes. In this embodiment, the hydraulic mechanism 100 is coupled to the ring gear 41 by means of an idler gear 44.

The gearbox 40 also includes a first clutch and brake arrangement 45 along the shaft to the IC engine 30, whereby the engine may be disconnected from the gearbox 40 by a clutch part of the first clutch and brake arrangement 45, and a disconnected shaft on the gearbox side may be locked by the brake part of the first clutch and brake arrangement 45, so as not to move.

Further, the gearbox includes a second clutch and brake arrangement 46 along a shaft to hydraulic mechanism 100, whereby the hydraulic mechanism 100 may be disconnected from the gearbox by a clutch part of the second clutch and brake arrangement 46. The gearbox 40 can be prevented from overspeeding by a first brake part (not shown) of the second clutch and brake arrangement 46 which is located on the hydraulic mechanism side of the disconnected shaft and which can be locked. A second brake part (not shown) of the second clutch and brake arrangement 46, located on the gearbox 40 side of the disconnected shaft, may be locked so as to prevent the disconnected shaft from rotating freely.

Even further, the gearbox includes a third clutch and brake arrangement 47 along the shaft to the final drive 20, whereby the final drive 20 may be disconnected from the gearbox 40 by a clutch part of the third clutch and brake arrangement 47, and a brake part (not shown) located on the gearbox 40 side of the disconnected shaft may be locked so to prevent the disconnected shaft from rotating freely.

Lastly, the gearbox 40 may have an internal set of clutches (not shown) which allows any two of the sun, planet carrier and ring gears to be locked together, so that the planetary gears 41, 42 and 43 of the gearbox 40 operate as a normal gear set, and not as a differential or power splitting unit.

It is envisaged that the operation of the drive arrangement 10 will include six main modes of operation.

In the first mode, the gearbox 40 will operate as a speed-summing differential, being driven mainly by the IC engine 30 and where the hydraulic mechanism 100 is controlled to balance the torque of the IC engine 30 and vary the output speed and in turn driving the final drive 20. The hydraulic mechanism 100 can either operate as a pump or as a motor depending on the torque and speed settings of the IC engine 30, the final drive shaft 20 torque and speed and similarly the torque and speed setting of the hydraulic mechanism 100. The IC engine 30 is connected to the gearbox 40 at the second clutch and brake arrangement 46 and unlocked, the hydraulic mechanism 100 is connected to the gearbox 40 and the brake part is unlocked, and the final drive is connected to the gearbox 40 and unlocked. In this mode the differential will sum the speed of the drive input shafts from the IC engine 30 and the hydraulic mechanism 100, but torque to the final drive 20 is controlled (and balanced between the IC engine 30, the hydraulic mechanism 100 and the final drive 20), by firstly varying the performance of the IC engine 30 (both the torque setting and speed setting) and secondly varying the awashplate 105 angle of the hydraulic mechanism 100 to give the desired output speed and torque on shaft 20.

In the second mode, the internal set of clutches (not shown) in the gearbox which allows any two of the sun gear 42, ring gear 41 and planetary carrier gears 43 to be locked together will be locked. The IC engine 30 is connected and unlocked, the hydraulic mechanism 100 is connected and unlocked and the final drive 20 is connected and unlocked. There will be a direct relationship between all the speeds of the IC engine 30, the hydraulic mechanism 100 and the final drive 20, which will depend on the mechanical gear ratios of the gearbox 40. In this mode the hydraulic mechanism 100 may be used as a pump or as a motor to drain or supplement torque supplied to the final drive 20 by the IC engine 30. If used as a drain, the energy drained will be stored in the accumulator tank 60 as pressure. In this mode the speed will be fixed by the IC engine 30 and the load speed, while the torque will be a summation of the torque of the IC engine 30 plus the torque of the hydraulic mechanism 100 (adding it when it act as a motor or minusing it when it acts as a pump). This mode would normally be used at higher final drive speeds, although it may also be used as a launch assist for improved acceleration from low speeds.

In the third mode, the hydraulic mechanism 100 is the only source of power to drive the final drive 20. The hydraulic mechanism 100 and the final drive 20 are connected to the gearbox 40 and unlocked, while the IC engine 30 is disconnected and the shaft to the engine is locked. In this mode, the IC engine 30 may be idling or off, since it is disconnected. This mode would normally be used for optimal fuel consumption when pulling off from rest or at other times when the IC engine 30 would not be operating at optimum efficiency. Alternatively, this mode could be used at times when there is sufficient stored energy to propel the vehicle for a period, without the IC engine.

When operating in the fifth mode, the final drive 20 is locked, although it may be connected (if the final drive is at rest) or disconnected (if the final drive 20 is not at rest but does not require drive power from the IC engine 30 or the hydraulic mechanism 100). The IC engine 30 is connected and unlocked and the hydraulic mechanism is connected and unlocked. In this mode, the IC engine 30 may be used to charge up the hydraulic mechanism 100 while the final drive 20 is at rest or freewheeling.

In the sixth mode, the final drive 20 is being braked and it will be supplying drive power to the gearbox 40 (i.e. regenerative braking). The final drive 20 and the hydraulic mechanism 100 are connected and unlocked, and the IC engine 30 is disconnected and locked. In this mode, the IC engine may be idling or off, since it is disconnected.

Referring to FIG. 1 the drive arrangement 10 further comprises a control system 70 for controlling the relative outputs and inputs of any combination of the hydraulic mechanism 100, IC engine 30, final drive 20, gearbox 40 or the various clutch and brake arrangements 45, 46 & 47, the internal clutch arrangement or the known clutch arrangements used to change the gear ratios between input and output shafts. It is well known that IC engines 30 have increased levels of efficiency at various speeds, which efficiency is also dependent on the level of throttle input to the IC engine 30.

It is envisaged that the control system 70 will allow the arrangement 10 to be controlled to allow for the optimisation of various parameters such as maximum power, efficiency of power usage, fuel efficiency, and the like. One example of this would be where the drive arrangement 10 is used in a vehicle. In this case, the hydraulic device 100 may be used as a pump, thereby acting as a load on the power being transmitted from the final drive during braking, in order to store at least a portion of the energy usually lost as heat during braking as pressure in the accumulator tank 60. This stored pressure in the accumulator tank 60 can be utilised later on to supplement or even completely replace the power transmitted from the IC engine 30 to drive the final drive 20, which in this case would be the drive wheels of the vehicle.

It is envisaged that the drive arrangement may have a second hydraulic pump 80 (shown in FIG. 1) connected between the gearbox 40 and the accumulator tank 60. This pump 80 will allow the IC engine 30 to charge the accumulator tank 60 and drive the final drive 20 while the energy stored in the accumulator tank 60 is being used to drive the hydraulic mechanism 100 as a motor, thereby supplementing the drive from the IC engine 30. In this way, the efficiencies of the various drive means may be optimized for various loads and performance requirements.

Similarly, where the power requirements of the final drive are such that the IC engine 30 is being used to drive the final drive 20 at speeds, loads and throttle openings that are not conducive to efficient operation of the IC engine 30, then the hydraulic mechanism may be used as a pump to increase the loading on the IC engine 30, while changing aspects of the IC engine 30, such as engine speed, throttle levels and torque loading so that the IC engine 30 will be operating at an increased overall efficiency. The extra energy produced by the IC motor 30 at better efficiencies is not lost, but stored for later use when there is demand for it.

The control system 70 similarly would be able to control the clutch and brake arrangement controlling the gear ratios in operation between the IC engine 30, final drive 20, and the hydraulic mechanism 100 in order to optimize a particular aspect such as fuel economy, acceleration (where the arrangement 10 is utilised in a vehicle), and the like.

Further, the control system 70 can be set up to take cognisance of the driving style of the driver, and to allow for the storage and/or utilization of energy according to that particular drivers requirements.

It is further envisaged that where the arrangement 10 is used in a vehicle (not shown), the control system 70 may be linked to a terrain logging and prediction facility (not shown), such as a Global Positioning System (GPS) or an electronic mapping system, so that energy usage and/or storage can be matched to the expected route of the vehicle.

It will be appreciated that many embodiments and variations are possible without departing from the spirit or scope of the invention. For example, it is envisaged that the first drive means may be an electrical motor, together with electrical batteries for storage of charge. Further, the control system may have different modes of operation, whereby various parameters may be optimized, such as fuel economy, vehicle acceleration, smoothness of ride and the like. Further, it is envisaged that the drive arrangement can be used for a wide variety of applications, such as driving a conveyor belt (not shown), an elevator, or for any other application, especially where frequent stop/start loading is normal.

The invention claimed is:

1. A drive arrangement suitable for driving a final drive, the arrangement comprising:
    a first drive means;
    a power-splitting gear arrangement;
    a first hydraulic mechanism operable either as a pump or a motor;
    the first hydraulic mechanism being capable of being driven from the first drive means or from the final drive or both concurrently, acting through the power-splitting gear arrangement;
    the final drive being drivable through the power-splitting gear arrangement from the first drive means or the first hydraulic mechanism or both concurrently;
    the first drive means being connectable to the power-splitting gear arrangement by a clutch part of a first clutch and brake assembly, a brake part of the first clutch and brake assembly being operable selectively to lock a first shaft of the power-splitting gear arrangement;
    the hydraulic mechanism being connectable to the power-splitting gear arrangement by a clutch part of a second clutch and brake assembly, a brake part of the second clutch and brake assembly being selectively operable to lock a second shaft of the power-splitting gear arrangement; and
    the final drive being connectable to the power-splitting gear arrangement by a clutch of a third assembly.

2. A drive arrangement as claimed in claim 1 wherein the first hydraulic mechanism comprises a hydraulic energy storage means.

3. A drive arrangement as claimed in claim 1 wherein the first hydraulic mechanism comprises an open loop over-center variable displacement hydraulic device.

4. A drive arrangement as claimed in claim 2 wherein the hydraulic device is an open loop over-center variable displacement axial piston hydraulic device.

5. A drive arrangement as claim in claim 4 wherein the hydraulic device comprises a manipulatable swash-plate that is controlled to move over-center, to allow the hydraulic device selectively to operate as a pump or as a motor.

6. A drive arrangement as claimed in claim 1 wherein the hydraulic mechanism comprises at least first and second devices, each selectively operable as a pump or a motor.

7. A drive arrangement as claimed in claim 1 wherein the power-splitting gear arrangement comprises a planetary gear.

8. A drive arrangement as claim in claim 7 wherein at least one of the first drive means, the hydraulic mechanism and the final drive is connected to the planetary gear by a respective shaft.

9. A drive arrangement as claimed in claim 1 wherein another brake part of the second clutch and brake assembly is operable selectively to lock a shaft of the hydraulic mechanism and wherein a brake part of the third assembly is selectively operable to lock a third shaft of the power-splitting gear arrangement.

10. A drive arrangement as claimed in claim 1 wherein the first drive means comprises an internal combustion engine.

11. A drive arrangement as claimed in claim 1 wherein the first drive means comprises an electrical motor and a charge storage means.

12. A drive arrangement as claimed in claim 1 comprising a control system.

13. A drive arrangement as claim in claim 1 when used in a vehicle.

14. A drive arrangement as claimed in claim 2 comprising a second hydraulic mechanism configured to allow the first drive arrangement to store energy in the hydraulic energy storage means while the energy is being utilized by the first hydraulic mechanism to drive the final drive.

15. A drive arrangement as claimed in claim 14 wherein the second hydraulic mechanism is similar to the first hydraulic mechanism.

* * * * *